(12) United States Patent
Brodt et al.

(10) Patent No.: US 7,137,201 B2
(45) Date of Patent: Nov. 21, 2006

(54) METHOD AND APPARATUS FOR THE PRODUCTION OF LOCALLY REINFORCED SHEET-METAL MOULDINGS AND PRODUCTS MADE THEREBY

(75) Inventors: Martin Brodt, Rennington (DE); Matthias Kroeger, Brakel (DE); Wolfgang Leutelt, Leonberg (DE); Robert Mayrhofer, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 577 days.

(21) Appl. No.: 09/972,195

(22) Filed: Oct. 9, 2001

(65) Prior Publication Data

US 2002/0069506 A1 Jun. 13, 2002

(30) Foreign Application Priority Data

Oct. 7, 2000 (DE) ................................ 100 49 660

(51) Int. Cl.
*B21D 53/88* (2006.01)
(52) U.S. Cl. ............................ 29/897.2; 29/505; 29/514
(58) Field of Classification Search ............... 29/897.2, 29/505, 514; 72/342.4, 342.5
See application file for complete search history.

(56) References Cited

U.S. PATENT DOCUMENTS

| | | | | |
|---|---|---|---|---|
| 1,423,747 A | * | 7/1922 | Bellamore et al. ...... | 29/894.324 |
| 3,240,269 A | * | 3/1966 | Thomas ....................... | 165/170 |
| 4,657,717 A | * | 4/1987 | Cattanach et al. .......... | 264/102 |
| 4,921,159 A | * | 5/1990 | Peck ........................... | 228/182 |
| 5,056,209 A | * | 10/1991 | Ohashi et al. ............... | 29/517 |
| 6,337,471 B1 | * | 1/2002 | Kistner et al. .............. | 219/633 |

FOREIGN PATENT DOCUMENTS

| | | |
|---|---|---|
| DE | 4307563 | 9/1993 |
| DE | 19529881 | 9/1996 |
| GB | 1 490 535 | 11/1977 |
| WO | WO/98/31485 | 7/1998 |

* cited by examiner

*Primary Examiner*—Marc Jimenez
(74) *Attorney, Agent, or Firm*—Crowell & Moring LLP

(57) ABSTRACT

A method and apparatus is provided for the production of locally reinforced drawn parts, in which the basic sheet of the structural part, in the flat or only preformed state, is connected in a defined position to the reinforcing sheet and this patched composite sheet structure is subsequently jointly formed. In order to improve the production method in terms of the product and result of the method and to relieve the forming tools during joint forming of the parts, the patched composite sheet structure is heated before forming at least to about 800° C. to 850° C. The composite sheet structure is then introduced quickly in the hot state to be rapidly formed. During forming the composite part is fixed mechanically and is subsequently cooled in a defined manner by contacting with the forming tool positively cooled from inside. Passage through a critical temperature range of 800° C. to 500° C. thus takes place with a defined temperature gradient. The step of connecting the reinforcing sheet and the basic sheet can be readily integrated into the forming process by the parts being hard-soldered to one another, with the result that effective corrosion protection at the contact zone can be achieved at the same time.

34 Claims, 5 Drawing Sheets

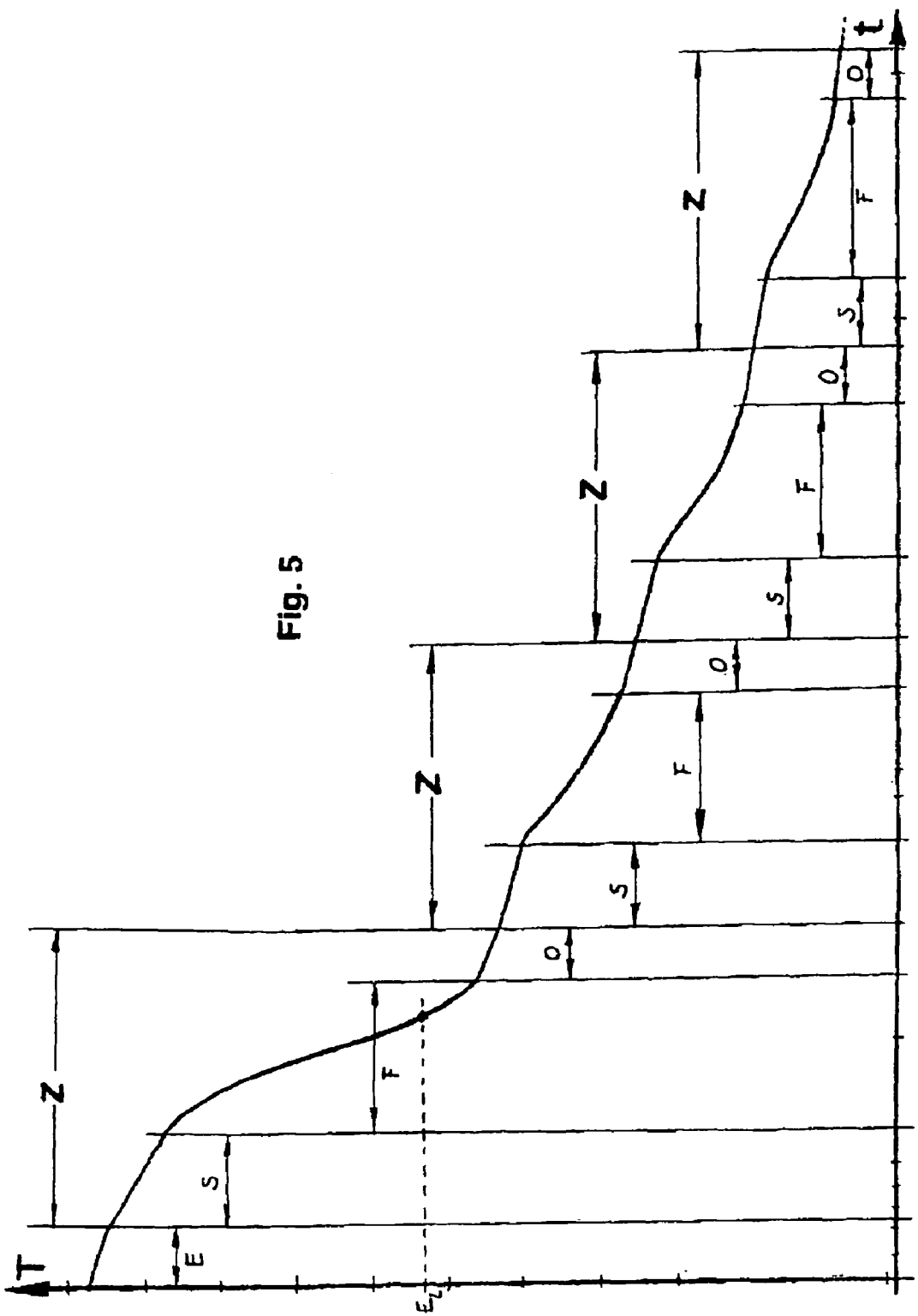

METHOD AND APPARATUS FOR THE PRODUCTION OF LOCALLY REINFORCED SHEET-METAL MOULDINGS AND PRODUCTS MADE THEREBY

BACKGROUND AND SUMMARY OF THE INVENTION

This application claims the priority of German Patent Document 100 49 660.1, filed in Germany, Oct. 7, 2001, the disclosure of which is expressly incorporated by reference herein.

The invention relates to a method and apparatus for the production of locally reinforced sheet-metal mouldings. Preferred embodiments relate to such sheet-metal mouldings as structural parts of motor vehicle bodies. German Patent Document DE 43 07 563 A1 also relates to such structural parts.

With a view to saving weight on motor vehicle bodies, it is known to provide locally restricted reinforcing sheets at force application points in sheet-metal structural parts of bodies, so that the entire structural part does not have to be produced from a thick sheet. To increase the flexural resistance of hollow members formed from sheet-metal shells, reinforcing sheets can be integrated, on the inside or outside, on at least one of the sheet-metal shells, these reinforcing sheets extending over a relatively long region of the hollow member. For stiffening purposes, stiffening tubes of constant cross section have also already been embedded inside the hollow members, but, although approximately following the profile of the hollow member, do not completely fill the cross section of the latter, instead being connected via web plates or directly to the wall of the hollow member at specific points only. Structures of this type for increasing the rigidity of a hollow member have been provided, for example, on the center pillars of passenger car bodies for a side-on crash situation. It is usually advantageous, again for reasons of weight, at the joints or connection points, that is to say at the intersections of hollow members, to integrate a locally restricted reinforcement into the wall of the transverse hollow member.

Previously, the basic sheet and the reinforcing sheet were in each case deep-drawn separately and these part-workpieces were subsequently welded together to form a complete structural part, thus presupposing two separate drawing and forming operations, two separate sets of tools and a separate operation for the assembly of three-dimensionally shaped sheet-metal parts. All this is time-consuming and costly.

In the method, known from German Patent Document DE 43 07 563 A1, for the production of locally reinforced sheet-metal structural parts for motor vehicle bodies, a sheet billet forming the basic sheet of the structural part is connected locally, that is to say at a predetermined point, in the flat state to a smaller reinforcing sheet of preferably higher strength, and this largely planar composite sheet structure is subsequently jointly deep-drawn in a press. The reinforcing sheet may itself be partially preformed, for example be provided with stiffening beads. The reinforcing sheet is so designed in its contour profile and is so positioned on the basic-sheet billet that, after deep-drawing, the reinforcing sheet optimally fills the force application point. Depending on the application, the reinforcing sheet may have a higher strength than the basic sheet, for which purpose a greater wall thickness of the reinforcing sheet and/or a better material quality may be provided. Under some circumstances, a multi-layer design of the reinforcing sheet is also recommended, the plurality of layers preferably having an extent of differing size.

As techniques for the connection of the basic-sheet billet and the reinforcing sheet, German Patent Document DE 43 07 563 A1 refers, inter alia, to setting or pressing assembly (so-called clinching), this being considered particularly advantageous because this assembly technique can intrinsically be integrated into the forming operation or into the affixation of any fastening elements—punch-in nuts, punch-in bolts. In this case, under some circumstances, the reinforcing sheet merely needs to be placed in a defined position after the basic sheet in the forming press. In addition, welding connection techniques and adhesive bonding techniques are also mentioned, and, with regard to these connection techniques, it is stressed, inter alia, that they leave the surface of the structural part unaffected. It is plainly recognized in the publication mentioned that the mutual contact surfaces of the basic sheet and reinforcing sheet must be protected against corrosion, because subsequent vehicle painting or wax preservation of these surfaces cannot permanently protect against the ingress of moisture. It is therefore recommended to use sheets galvanized at least on one side for the basic sheet and the reinforcing sheet or, instead, to insert a protective film made of plastic or metal at the contact point. The corrosion-preventing action of any adhesive layer is also emphasized.

Admittedly, as compared with the procedure outlined above, with a separate forming of the basic part and the reinforcing part, the method known from German Patent Document DE 43 07 563 A1 is substantially more cost-effective because the deep-drawing operation is combined in a single uniform work cycle. However, disadvantages are, on the one hand, that very high forming forces are necessary for this purpose, particularly when the reinforcing sheet has a higher strength or even itself has a multi-layer design. This is manifested in correspondingly higher stress and therefore in a higher elastic deformation of the individual parts of the forming press, thus, in turn, leading to lower working accuracy and a shorter useful life of the forming tools and the press. It is true that the higher stress or the higher elastic deformation of the press parts can be compensated by a corresponding dimensioning of the latter, although this increases the costs of the press. However, the increased tool wear cannot be compensated and therefore likewise adds to the piece costs of the structural parts produced.

In the already known technique, assessed here, of the common forming of patched composite sheets, it must be remembered that the degrees of reinforcement capable of being achieved thereby are only limited, since the forming and drawing forces of the reinforcing sheet can be transmitted into the latter to a substantial extent only indirectly via the basic sheet and via the connection points between the basic sheet and the reinforcing sheet which are affixed peripherally to the reinforcing sheet. If, whether because of the higher material strength or because of the greater wall thickness or on account of both measures, the reinforcing sheet is substantially more resistant than the basic sheet, it cannot be formed in any desired way jointly with the basic sheet. If particularly high degrees of reinforcement are to be implemented locally, the basic sheet and the reinforcing sheet must in each case be formed separately and the two parts subsequently welded to one another to form a composite part.

Regardless of whether the reinforcing sheet is formed jointly with the basic sheet to form a structural part or whether, as mentioned in the introduction, the basic sheet and the reinforcing sheet are in each case formed separately and two mouldings are only subsequently assembled to form the structural part, it is particularly important, in view of the intended reduction in the wall thickness of the basic sheet for reasons of weight and the consequently likewise reduced corrosion reserve, to have effective corrosion protection at the contact point of the basic sheet and reinforcing sheet, to avoid the risk of a reduced useful life of the structural part. Effective corrosion protection at the contact point of the sheets by means of the method known from German Patent Document DE 43 07 563 A1 cannot be reliably ensured even by corrosion protection films being interposed. To be precise, an interposed corrosion protection film is destroyed locally by the punctiform connection points (clinches or spot welds) between the basic sheet and reinforcing sheet, so that moisture creeping in by capillary action may lead to corrosion precisely at the connection points and in time may pit the relatively thin basic sheet there. In spite of painting and wax preservation, the ingress of moisture to the contact surface between the basic sheet and the reinforcing sheet must be expected, even in the protected inner region of bodies, because of the formation of perspiration water and on account of capillary action.

On the basis of the above assessment of the known method according to German Patent Document DE 43 07 653 A1, the weak points of this method which are inherent in the system may be summarized as follows:
limited degrees of forming of the sheets jointly to be formed;
a high recovery behavior of the jointly formed sheets;
because of this recovery behavior, comparatively low dimensional accuracy of the structural parts;
due to the indirect transmission of forming forces into the reinforcing sheet, only limited degrees of reinforcement can be implemented at the reinforcing points;
high pressing forces during joint forming and therefore high investment costs;
high tool wear and therefore an increase in piece costs;
limited corrosion protection on the assembly surface.

DE 195 29 881 C1 discloses the production of a deep-drawn part from a sheet of hardenable spring steel, the spring steel being deep-drawn in the warm state of the sheet and, in the ready-formed state, being brought to spring steel hardness by subsequent heat treatment, although there is no mention of where and how this takes place. Heat treatment subsequent to deep-drawing entails the risk that the parts will warp and therefore be subject to a pronounced dimensional and/or shape-related spread. Apart from this, in the case of locally sharply varying stress on the components, the wall thickness must be designed for the point where stress is greatest, thus leading to an overdimensioning of the wall thickness at points where stress is relatively low. It would be conceivable, in theory, subsequently to reinforce this moulding locally by the welding-in of a reinforcing sheet. However, this would not be expedient since the hardness of the basic sheet and/or that of the reinforcing sheet would be lost locally at the welds. It would be appropriate, if the sheets involved had high strength, to rule out other connection techniques, such as soldering, adhesive bonding or clinching, because these connection techniques would not be feasible without the basic sheet and/or the hardened material structure being impaired (soldering, clinching) or because they would not afford the necessary strength (adhesive bonding). The connection points would have to have at least approximately the same strength as that of the hardened basic sheet, in order to achieve the desired reinforcing effect of the embedded sheet. The known method according to German Patent Document DE 195 29 881 C1 therefore has the following weak points, and reference may be made partially to the statements regarding the literature reference mentioned in the introduction:
only light-weight construction possible because of a uniform wall thickness;
no local reinforcements possible;
comparatively low dimensional accuracy of the structural parts because of the heat treatment.

An object of the invention is to improve the generic production method in terms of one or more of the following criteria:
With regard to the product of the method, to the effect that higher local degrees of reinforcement can be achieved in a unitary manufacturing step, in comparison with the basic sheet or with the unreinforced component.
As regards the result of the method, to the effect that a higher working accuracy of the mouldings than hitherto can be achieved.
As regards the means for carrying out the method, to the effect that the forming tools and the forming press are subject to lower stress than expected and, to that extent, a justifiable useful life can be expected.

This object is achieved according to certain preferred embodiments of the invention, by providing a method for the production of a three-dimensionally shaped structural part comprising a basic sheet and at least one smaller locally arranged reinforcing sheet, in which the basic sheet is connected in a flat state or in an incompletely formed preforming state, to a reinforcing sheet at the point predetermined for a subsequent reinforcing point, and the parts of the patched composite sheet structure are subsequently jointly formed by an openable and closeable forming tool in a forming press, wherein the patched composite sheet structure is heated before joint forming to a temperature which is above a forming temperature of the material, is formed in a hot state into a desired shape and is subsequently cooled in the forming tool, which is kept closed, or in a following fixing tool, with the desired forming state being fixed mechanically.

In accordance with preferred embodiments of the invention, the patched composite sheet is formed in the warm state into the desired shape and is cooled in a defined manner on the forming tool, with the forming state being maintained mechanically.

The invention affords a cost-effective way of obtaining a novel light-weight construction concept. To explain this, it may first be recalled that a low weight of a body co-determines essentially the performance (driving enjoyment) and fuel consumption (cost level) of the vehicle and is therefore directly to the customer's benefit. On the other hand, for reasons of high occupant safety, a vehicle body should be as rigid as possible in the region of the passenger cell, the effect of this tending towards a heavier body. These two contradictory requirements as regards weight are, moreover, in direct relation to the costs of the body. The costs, on the one hand, and the weight, on the other hand, tend to develop in opposition to one another; the lighter the design of the body is, the more costly it is, as a rule, to produce, whereas a body construction which exhausts the range of available light-weight construction measures to a lesser extent can be produced more cost-effectively. However, within this network of relations between the function, the costs and the weight of a body, the hot forming according to the invention of structural parts made of steel sets new boundary conditions which make light-weight construction possible at moderate cost, whilst at the same time increasing its functioning. The potentials and advantages of the production method according to the invention are summarized as follows.

A cost-effective light-weight construction becomes possible.

Materials with high and the highest possible strength can be used. The material strength capable of being achieved can be increased about three times, as compared with conventional maximum values.

Despite the use of high-strength materials, high degrees of forming can readily be implemented.

Any desired degrees of reinforcement of the basic sheet can be implemented within wide limits.

The conventional sheet-metal shell construction and the design and repair know-how connected with this can be maintained. The latter assumes great infrastructural importance.

In so far as reinforcements still become necessary, these can be integrated into one shell and into the production of the latter.

Due to the hot forming, the recovery behavior of the sheet-metal parts after the forming process is negligible, thus increasing the manufacturing accuracy. Low manufacturing tolerances can readily be implemented.

The outlay in terms of co-ordination between the forming tool and the structural parts is no higher, but instead lower than in the forming of simple sheet-metal parts.

The costs of plant and tool investments, of the machine hours necessary and of logistics and stockkeeping are reduced.

This list of advantages according to the invention contains some which constitute a synergetic excess with respect to a sum of advantages taken together from different sources of the prior art, specifically the following are to be particularly emphasized as synergetic advantages:

Despite the use of high-strength materials, high degrees of forming can readily be implemented.

Any desired degrees of reinforcement of the basic sheet can be implemented within wide limits.

Due to the hot forming, the recovery behavior of the sheet-metal parts after the forming process is negligible, thus increasing the manufacturing accuracy. Low manufacturing tolerances can readily be implemented.

So that the structural parts produced can be protected more effectively against corrosion in the contact region between the basic sheet and the reinforcing sheet, in an expedient embodiment of the invention the contact surface of at least one of the sheets is provided in a surface-covering manner with a hard solder before the reinforcing sheet is affixed to the basic sheet, advantageously both contact surfaces previously being cleaned. During the heating of the patched composite sheet structure to forming temperature, this preferably taking place in a protective-gas atmosphere of a furnace, the applied hard solder is melted. During the forming process, an intimate and pore-free soldered joint is produced by the sheet-metal parts being deformed and pressed together. The hard solder, which fills the contact zone in a surface-covering manner, later reliably prevents the ingress of moisture and affords highly effective corrosion protection. The hard solder is preferably applied with an excess which is expressed at the edge of the reinforcing sheet during forming. As a result of the soldering, the step of connecting the reinforcing sheet and the basic sheet is readily integrated into the forming process. It is merely necessary, for example by means of a single connection point placed after the application of the solder, but before heating, between the reinforcing sheet and the basic sheet, to ensure that, during handling, the reinforcing sheet and the basic sheet unequivocally maintain their mutual desired position and, for example, cannot slip out of place in relation to one another.

Further expedient embodiments of the invention may be gathered from the following description and the claims.

Other objects, advantages and novel features of the present invention will become apparent from the following detailed description of the invention when considered in conjunction with the accompanying drawings.

BRIEF DESCRIPTION OF THE DRAWINGS

FIG. 5 shows a temperature/time graph which illustrates the temperature profile during the production of a moulding produced in the plant of the method according to FIG. 4.

DETAILED DESCRIPTION OF THE DRAWINGS

Figure 1A:
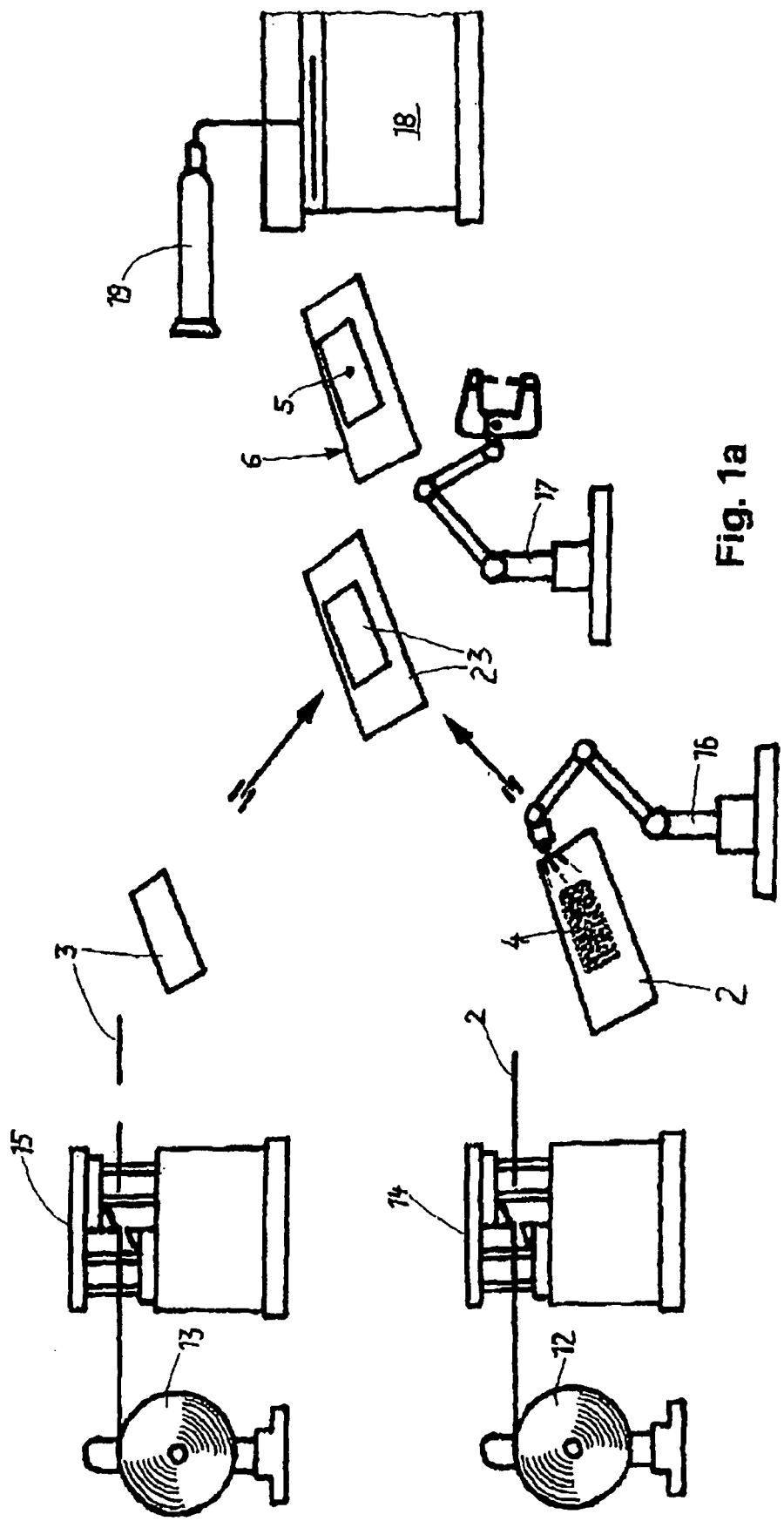
FIGS. 1a and 1b, taken together, show a method diagram according to a first exemplary embodiment of a common hot forming of the basic sheet and reinforcing sheet, the latter being hard-soldered to the basic sheet, in accordance with preferred embodiments of the present invention.
Figure 1B:
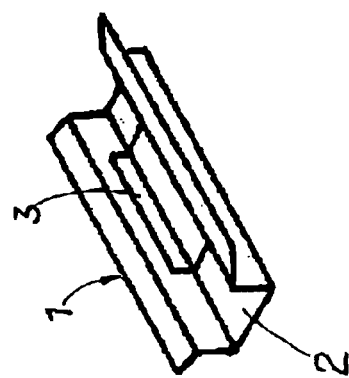
Figure 1B:
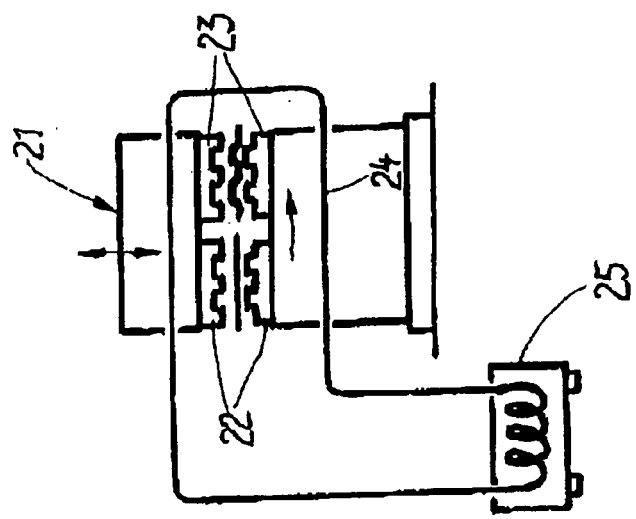
Figure 1B:
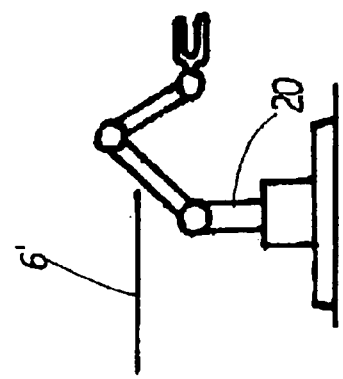
Figure 1B:
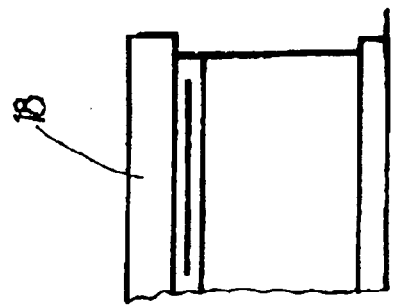

The method diagram jointly illustrated in FIGS. 1a and 1b serves for the production of a three-dimensionally shaped structural part 1 which comprises a basic sheet 2 and of a smaller, locally arranged reinforcing sheet 3. In this case, the basic sheet 2 of the structural part is connected, in the flat state, to the reinforcing sheet 3 at the point predetermined for the subsequent reinforcing point, and the parts of the composite sheet structure 6 patched in this way are subsequently jointly formed in a forming press 21 by means of an openable and closable forming tool 22.

In order to improve the production method in terms of the product and result of the method and to relieve it in terms of the means carrying out the method, according to the invention the patched composite sheet structure 6 is heated, before joint forming, to a temperature which is above the forming temperature of the material, in the hot state is formed into the desired shape under moderate tool stress and subsequently, with the desired forming state fixed mechanically in the forming tool 22 kept closed and/or in a subsequent fixing and trimming tool 23, is cooled in a defined manner and, as a result, is heat-treated specifically.

The plant illustrated diagrammatically in FIGS. 1a and 1b provides, for carrying out the method according to the invention, in each case an unwinding device for a coil 12 for the basic sheet and for a coil 13 for the reinforcing sheet. The unwound sheets, after being straightened, are divided in lifting shears 14 and 15 into individual basic-sheet billets 2 and into individual reinforcing-sheet billets 3 which are further processed intermittently. The two coils 12 and 13 are of different width according to the different width of the blanks 2 and 3. The thickness of the individual sheets depends on the load on the structural part in the unreinforced region of the basic sheet, on the one hand, and on the desired reinforcing effect, on the other hand, and must be optimized for each individual case. The reinforcing sheet will usually be thinner than the basic sheet. Cases with high local reinforcement, in which the reinforcing sheet is thicker than the basic sheet, may, however, also be readily envisaged. It may prove expedient here, under certain circumstances, to have a multi-layer reinforcement consisting of two reinforcing sheets of different size, laid one on top of the other, the reinforcement increasing in steps from its outer edge according to the number of layers.

Figure 3:
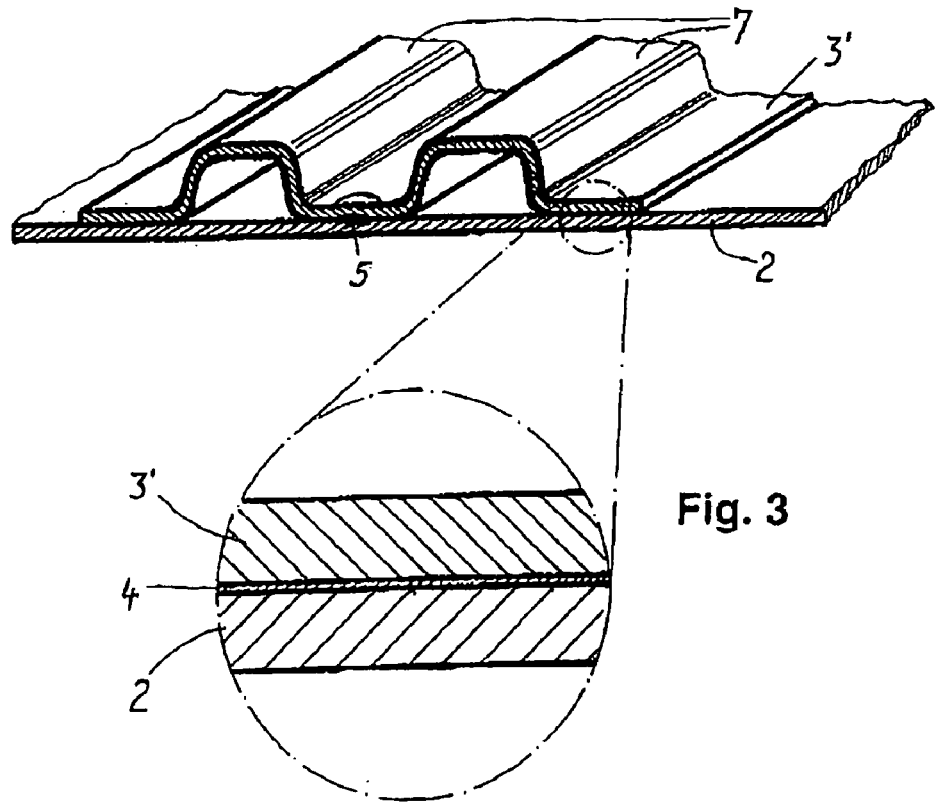
FIG. 3 shows a cross section through a further exemplary embodiment of a patched composite sheet structure, in which the reinforcing sheet provided with reinforcing beads is preformed before being combined with the basic sheet, in accordance with preferred embodiments of the present invention.

As regards the rigidity of the reinforcing sheet, it may be pointed out, even at this juncture, that this may be influenced not only by the material strength, the sheet thickness and/or the number of layers, but also by a suitable structural stiffening. To be precise, according to the illustration in FIG. 3, the reinforcing sheet 3' may itself, before being combined with the basic sheet 2, be preformed by the affixation of reinforcing beads 7 and thereby structurally stiffened. In this case, however, care must be taken to ensure that the preformed reinforcing sheet 3' nevertheless can come to bear in a dimensionally accurate manner at the predetermined point on the basic sheet 2 and can be fixed to the latter.

As regards the material, both sheets may preferably consist of the same or a similar material. Two different materials which are known per se and are obtainable in the trade for deep-drawn sheets and which may be considered for the basic sheet 2 and/or the reinforcing sheet 3, 3', are proposed below. Specifically, on the one hand, a water-hardening heat-treatable steel from the German company Benteler AG, which is sold under the trade designation BTR 165, may be mentioned in this respect. This steel has the alloying composition listed below, where the contents of the alloying partners to be added in addition to iron as the basic metal are to be understood in percentages by weight:

| | |
|---|---|
| Carbon: | 0.23–0.27%, |
| Silicon: | 0.15–0.50%, |
| Manganese: | 1.10–1.40%, |
| Chromium: | 0.10–0.35%, |
| Molybdenum: | 0–0.35%, |
| Titanium: | 0.03–0.05%, |
| Aluminum: | 0.02–0.06%, |
| Phosphorus: | max. 0.025% |
| Sulphur: | max. 0.01%, and |
| Others in total: | 0.0020–0.0035%. |

On the other hand, a sheet from the French company Sollac SA, which is precoated inorganically against corrosion and which the latter sells under the trade designation 22MnB5, is also recommended. The inorganic precoating of the sheet—an aluminum/silicon coating which partially diffuses into the basic material during heat treatment to form a three-phase laminated material Al/Si/Fe—prevents scaling and decarbonization of the sheet during heating and makes pickling and phosphatizing of the sheet unnecessary. The coating readily permits the conventional welds. The uncoated sheet consists of a steel having the alloying composition listed below, where the contents in addition to iron as the basic metal are likewise to be understood in percentages by weight:

| | |
|---|---|
| Carbon: | 0.20–0.25%, |
| Silicon: | 0.15–0.35%, |
| Manganese: | 1.10–1.35%, |
| Chromium: | 0.10–0.35%, |
| Titanium: | 0.02–0.05%, |
| Sulphur: | max. 0.008%, and |
| Others in total: | 0.002–0.004%. |

The method diagram illustrated in FIGS. 1a and 1b provides a hard-soldered connection of the two blanks. Consequently, in the exemplary embodiment shown in FIG. 1a, the basic-sheet billets 2 are provided locally on a predetermined surface, by an applicator robot 16, with a hard-solder application 4 which is applied, for example, in the form of a sprayable paste. It may also be noted, at this juncture, that other forms of the hard-solder application may also be envisaged, for example the laying in place of a soldering foil blank punched out according to shape or the spreading or laying in place of chips. As regards a hard-soldered connection of the sheet-metal parts, it may, under certain circumstances, be advantageous, furthermore, if the contact surfaces both of the basic sheet and of the reinforcing sheet are cleaned before the application of hard solder 4 and/or are activated for hard soldering, although this is not illustrated in FIG. 1a. Moreover, it may be mentioned, for the sake of completeness, that the hard solder may additionally or alternatively also be applied to the contact surface of the reinforcing sheet 3. The hard solder 4 is expediently applied with some excess, so that, after the melting of the hard solder during the common hot forming of the sheet-metal parts, this excess can be expressed at the edge of the reinforcing sheet 3; cf. FIG. 2 and the solder excess 35 expressed at the edge there. This expressing of hard-solder excess not only eliminates gas inclusions and thus provides a pore-free soldered joint, but the edge of the reinforcing sheet is effectively sealed by the excess 35 collecting at the edge and occurring there as a meniscus and the stepped transition to the base sheet is mitigated somewhat as regards wall thickness and notch effect.

After the application of hard solder, the sheet-metal parts 2 and 3 are laid one on top of the other in a defined position according to the mutual desired position of the sheets which is required, and this can be carried out efficiently and reliably by means of an auxiliary device. The two sheets are subsequently provisionally fixed to one another by means of the welding robot 17, preferably by means of only a single tacking point 5, in order to secure the relative position of the sheet-metal parts.

The composite sheet structure 6 patched in this way is introduced in an automated manner into a continuous-flow furnace 18, the furnace atmosphere of which is inertised by the specific and sufficient addition of a protective gas, for example from the gas bottle 19, in order to prevent a scaling of uncoated interfaces of the sheets or—when uncoated sheets are used—on the entire sheet surface. The protective gas may, for example, be carbon dioxide and/or nitrogen. In the furnace, the composite sheet structure is heated to above a structural transformation temperature of the material— usually a specific temperature within the temperature range between 850 and 930° C.—above which the material structure is in the austenitic state. As a result, it is possible to have a heat treatment of the material by specific cooling and therefore a setting of the material strength capable of being achieved thereby.

The charging of the continuous-flow furnace may be carried out, for example, by means of automated charging devices known for furnaces, in which case care must be taken to ensure that the composite sheet structures are in a grip-compatible defined position in the furnace and that the sheets are in a distortion-free, virtually full-surface flat position supported by a grate. By contrast, because of the rapid transfer of the heated composite sheet structures 6' from the furnace into a forming tool, a handling robot 20 is provided for extracting the composite sheet structure from the furnace 18. This handling robot 20 grips the heated composite sheet structure 6', already lying in the defined position, in the furnace at predetermined points and immediately thereafter quickly introduces it into the open forming tool 22 likewise in a defined position. This timespan, measured up to the commencement of the closing of the forming tool 22, lasts only a few seconds. The introduction is therefore preferably concluded in less than two seconds, see the timespan E (introduction) in FIG. 5 at the commencement of the process, so that the cooling of the workpiece caused thereby is only slight and can be allowed for by the choice of a correspondingly higher furnace temperature.

Figure 2:
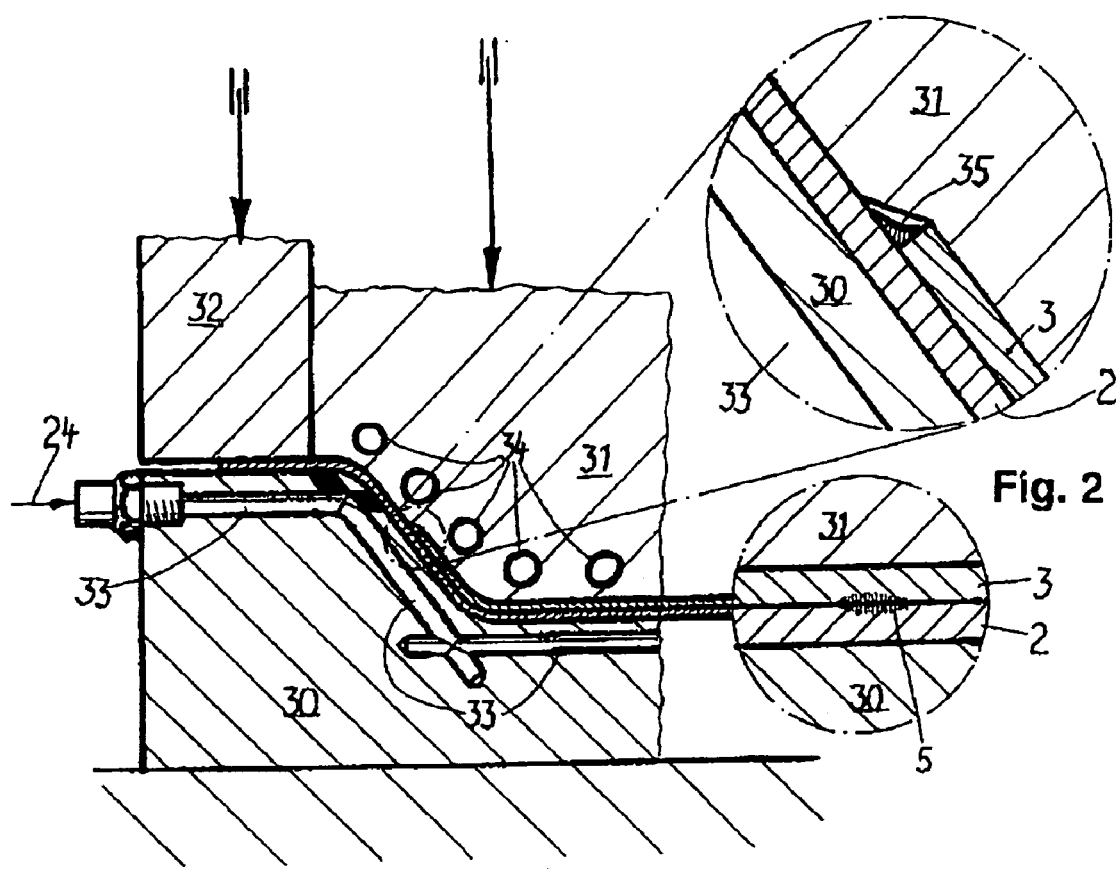
FIG. 2 shows a partial section through the positively cooled forming tool according to FIG. 1 in an enlarged illustration.

In the exemplary embodiment illustrated in more detail in FIG. 2, the forming tool 21 consists, in the lower stationary part, of a female die 30 with a fixed holding-down edge which extends, as a rule, in one plane, usually even in a horizontal plane. The upper liftably moveable part of the forming tool consists of a male die 31 with a holding-down device 32 which can be separately driven in a liftably moveable manner and the planar bearing surface of which is arranged parallel to the holding-down edge of the female die. When the heated composite sheet structure 6' is introduced into the open forming tool, the composite sheet structure first lies on the holding-down edge of the female die merely on the outside and freely spans the impression of the latter. During the closing of the tool, first the holding-down device 32 comes to bear on the edge of the composite sheet structure and clamps the latter with a predeterminable clamping force in such a way that the edge can slide out of the clamping under a specific pull. Only after the edge clamping is thereby brought about by the holding-down device 32 is the male die set down onto the composite sheet structure so that the forming operation commences.

During hot forming, the holding-down device 32 should be insulated. Preferably, however, hot forming is carried out without a holding-down device, since this avoids the sheet being cooled too quickly.

As a result of the persistent descent of the male die 31, the sheet-metal parts of the heated composite sheet structure 6' introduced are jointly formed. Despite the large common sheet thickness, because the composite sheet structure is in the hot state the forces to be exerted by the forming press 21, on the one hand, and the frictional forces active on the surface of the forming tool, on the other hand, are comparatively low. The work can therefore be carried out with a conventional press structure for normal deep-drawing operations and with a customary cost level.

The reinforcing sheet 3, which lies securely in position, but, in practice, only loosely on the basic sheet 2, can, as a rule, be formed into the desired shape in a crease-free manner even without any pull. This is the case particularly when, as usually occurs, the zones of the structural part which are to be reinforced have a spatially only slightly curved profile. The timespan S (see FIG. 5) for closing the forming tool and for the forming itself, counting from the commencement of the closing of the forming tool 22 up to the complete forming of the composite sheet structure, takes place very quickly and immediately after the introduction of the composite sheet structure. This essential phase is preferably concluded in 3 to 5 seconds. Admittedly, because of the partial contact of the composite sheet structure with the impression of the forming tool, the heat loss in the composite sheet structure at the contact points is locally greater in this timespan than during the introduction phase when, with the exception of the hot gripping tongs of the handling robot, the composite sheet structure comes into contact only with ambient air. However, the impression of the lower female die 30 does not at first come into contact with the composite sheet structure at all, but only at the very end of the forming process. Furthermore, the upper male die 31 initially comes into contact with the composite sheet structure only partially and in the regions in which the degree of forming, as a rule, is in any case only comparatively slight. In the regions not or not yet touched by the impression, the heated composite sheet structure is surrounded by stagnant air and to that extent is even insulated against heat losses. At any rate, the composite sheet structure cools only moderately during the forming phase and, despite partial contact with the impression of the forming tool, can readily be hot-formed under low forces and to a great extent. In addition to relieving the press and the forming tool, hot forming has the further appreciable advantage that substantially higher degrees of forming of the composite sheet structure (as compared with cold forming) can be carried out in a single forming pass.

After the parts of the composite sheet structure have jointly been put into the desired shape in the hot state as a result of the closing of the forming tool, the formed composite sheet structure is immediately thereafter cooled, the composite sheet structure being fixed mechanically in the desired forming state during this cooling time. As a result of the cooling, not only is the hard solder solidified, with the result that the soldered joint can even then be subjected to load, but, by defined cooling, the material used is, above all, heat-treated specifically and, correspondingly, a specific material strength is set in it. Moreover, by virtue of the mechanical fixing of the formed sheet during cooling in the desired state required, the soldered joint is kept closed in the solidification phase of the hard solder, and, furthermore, despite the heat treatment, not only is the forming state of the composite sheet structure stabilized reliably and in a dimensionally accurate manner, but a recovery tendency is also eliminated. As a result, highly accurate workpieces with only a small dimensional and/or shape-related spread are thereby produced.

In order to allow a specific cooling of the formed composite sheet structure in the forming tool, according to the illustration in FIG. 2 the impressions of the female die 30 and of the male die 31 are provided with cooling ducts 33 and 34 which run near the surface and are incorporated into a cooling circuit 24, the coolant of which can be circulated positively by a pump, not illustrated. The heated coolant can be recooled by a heat exchanger 25 integrated in the cooling circuit, the cold energy used in this case being capable of being applied, for example by a refrigerating assembly or by cold service water, from a suitable outfall (water conduit, river). In the exemplary embodiment illustrated, the cooling ducts 33 of the female die, on the one hand, and the cooling ducts 34 of the male die, on the other hand, are arranged crosswise in relation to one another, in order as far as possible not to leave behind any streak effect on the workpiece during cooling.

For reasons which will become clear below, in the example illustrated in the method diagram according to FIGS. 1a and 1b, cooling takes place in two successive stages. The first cooling phase occurs as a result of contact with the positively cooled impression of the forming tool 22 itself, two considerations being decisive for the target temperature of this first cooling phase. On the one hand, in the case of the hard-solder connection of the sheets in the composite structure, the initially melted hard solder must be cooled at least up to the complete solidification of the hard solder 4, with the formed composite sheet structure at the same time being fixed mechanically, and this solidification may be brought about as quickly as desired or as slowly as desired. On the other hand, a specific material strength is to be achieved by means of heat treatment, for which purpose, as regards the steels in question, a target temperature of 500° C. and a specific cooling rate are important. It is therefore important that, after common forming, the patched composite sheet structure, remaining in the forming tool 22 which is kept closed, is cooled at least to about 500° C. It is important, furthermore, that not only the melting point, but, above all, the solidification point, that is to say the solidus temperature, of the hard solder used is well above 500° C.

With regard to the cooling rate to be maintained, the following is applicable: a martensitic material structure in the formed composite sheet structure may be expedient when the highest possible strength is required in the structural part and no or only very low ductility is required. In such a case, the hot-formed composite sheet structure should be cooled rapidly in the temperature range between 800 and 500° C., that is to say from 800 to 500° C. in less than four seconds.

However, with a view to a good failure behavior of the structural parts in the event of a crash, the aim is usually to achieve comparatively high strength in conjunction with high ductility of the material. In this case, the aim is a bainitic material structure in the formed composite sheet structure. For this purpose, the workpiece should be cooled comparatively slowly in the temperature range between 800 and 500° C., to be precise from 800 to 500° C. in a timespan lasting longer than four seconds.

It would be conceivable per se, while the workpiece remains in the forming tool and with the fixing state being maintained, for said workpiece to continue to be cooled to a temperature at which the workpieces can be handled and/or stored readily, in particular without uncontrolled structural changes. If the tool-integrated cooling is efficiently designed, the total cooling time necessary for this purpose is about 20–40 seconds, depending on the sheet thickness, workpiece size and final temperature, and the bulk of cases will be within the range of 25–30 seconds. In a pilot phase of manufacture or in the case of small batch sizes, such single-stage cooling is undoubtedly appropriate. Usually, however, structural parts of this type are required in large quantities and efficient mass manufacture should be set up. On this presumption, it is expedient for the workpieces to be cooled in more than one stage, but at least in two stages.

The method diagram according to FIG. 1b accordingly provides two-stage cooling which has the advantage that the necessary operation of trimming the workpiece can be carried out even at an increased temperature of about 500° C., which, particularly in the case of increased material strengths, signifies a considerable relieving of the cutting tools. On the other hand, the advantage of two-stage cooling is that the forming tool is freed again more quickly for receiving a new composite sheet structure, that is to say the cycle time is shortened and manufacture is rationalized.

In two-stage cooling, after common forming, the patched composite sheet structure, while remaining in the forming tool 22 which is kept closed, is first cooled to about 500° C. along a specific time-averaged temperature gradient and is subsequently transferred into an openable and closeable fixing tool 23 adjacent within the forming press. The two adjacent tools, to be precise the forming tool 22, on the one hand, and the fixing tool 23, on the other hand, are arranged inside the forming press 21 in the manner of progressive tools and are connected by means of a transfer device, known per se, which, during the opening of the press, lifts the workpieces out of the adjacent tools in synchronism and passes them on into the next tool or into a depository arranged outside the press.

The composite sheet structure received in the fixing tool is likewise in contact therein, in the closed state, over its surface on both sides with a dimensionally accurate impression and the desired forming state of the composite sheet structure thus continues to be fixed mechanically. Integrated into the fixing tool 23 is a trimming tool, not illustrated in any more detail, by means of which the formed composite sheet structure is trimmed in the prevailing hot state. Specifically, the no longer required holding-down or drawing edge of the basic sheet is cut off. The trimming device required for this purpose is known per se and is not also illustrated. The impression of the fixing tool is likewise positively cooled by means of cooling ducts integrated near the surface, so that heat can continue to be extracted from the mechanically shape-fixed workpiece by contacting. To avoid a streak effect during cooling, it is expedient, in the case of the fixing tool, to arrange crosswise in relation to one another the cooling ducts located on the topside and on the underside. Where the fixing and trimming is concerned, the existing workpiece shape needs to be secured only mechanically, that is to say there are no forming and friction operations on the surface of the fixing tools under the action of force. The fixing tool can therefore be designed as a light-weight structure and consist of a lower-strength material, for example of aluminum. In particular, the surface of the fixing tool does not need to be closed. On the contrary, by the integration of a grid of ducts open towards the tool surface, the workpiece can be acted upon directly by a cooling fluid, in particular by cooling air. By water mist and/or liquid air being admixed with the cooling air, very considerable cooling rates can be achieved even with air as the heat transfer medium. The cooling time of about 25–30 seconds, already mentioned further above, is also achieved in the case of two-stage cooling, a transfer-induced interruption in cooling not being included.

After two-stage cooling, the hot-formed structural part, together with a local hard-soldered reinforcing part, can be extracted in the trimmed state and further processed. The workpieces are distinguished by high strength, low weight, low piece costs and high dimensional and shape-related accuracy. As a result of the heat treatment integrated into the common hot-forming process, the material strength of the composite sheet structure can be increased to about 1300–1600 MPa. By virtue of the high material strength, the locally reinforced structural parts thus produced are suitable pre-eminently for light-weight structures, in particular as shell parts for hollow members integrated into the passenger cell of a vehicle body. Another field of use within vehicle construction is locally reinforced shell parts for hollow members integrated into the chassis of a vehicle.

For reasons of as short a cycle time as possible, the aim should be to cool the formed workpieces within the forming press only to a temperature at which the workpieces can be handled and/or stored readily, in particular without uncontrolled structural changes. Such a temperature can usually be assumed to be around 100 to 150° C. Admittedly, parts at such a temperature cannot readily be handled manually. Further cooling outside the forming press by means of cooling air along a cooling zone is therefore to be recommended, in which case the workpieces should be supported by means of conformed passage-permitting supporting shells in order to avoid thermal distortion. In this case, cold water mist and/or—particularly nearer to room temperature—liquid air may be added to the cooling air.

As regards the method diagram according to FIGS. 1*a* and 1*b*, various modifications of the method may also be mentioned for the sake of completeness:

The method does not rely on a hard-solder connection of the formed sheet-metal parts 2 and 3, even though this type of connection can be combined in a particularly advantageous way with hot forming. Instead of a hard-solder connection, a connection by means of a welded joint may also be considered, and, in particular, all current welded joints are relevant here. Mention may be made, in this respect, particularly of spot welds, MIG/MAG welds or laser welds. In this case, in the method diagram of FIG. 1*a*, the hard-solder application would be dispensed with and, instead, the welding operation would be carried out by the welding robot 17 more comprehensively and, under some circumstances, by other welding methods. Above all, connection points or weld-seam pieces would be placed at the edge of the reinforcing sheet. Admittedly, it is also possible, in principle, first to connect the reinforcing sheet to the basic sheet by means of only one weld spot or only a few weld spots and to carry out the complete load-bearing connection only after forming. However, for various reasons, it is more advisable to carry out the complete welding together of the reinforcing sheet and basic sheet, at least in the edge region, even before hot forming. On the one hand, in the flat state, the sheets can be handled more simply and can be welded more efficiently and with greater process reliability. On the other hand, it is better if the welds also run through the heat treatment, as compared with the variant in which the already heat-treated sheets are subsequently welded. Finally, it is also better for the forming process if the sheets involved are connected to one another securely, in particular at the edge. It is also conceivable to seal off the sheets relative to one another by means of silicone or similar sealing materials.

In a further method variant, the cooling rate of the composite sheet structure after hot forming is different according to a different material strength required locally. Applications may be envisaged, in which, for reasons of an ordered crash behavior of a structural part, higher ductility and lower strength are to be present in it locally. Regions of this type may be achieved readily by the hot-formed composite sheet structure not being cooled or being cooled very slowly at these points, although, by a sustained cooling of the transitional zone from regions of lower strength to the regions with a desired high material strength, care must be taken to ensure that there is no tempering effect from the weak point (hot) to the high-strength zones (cold).

Figure 4:
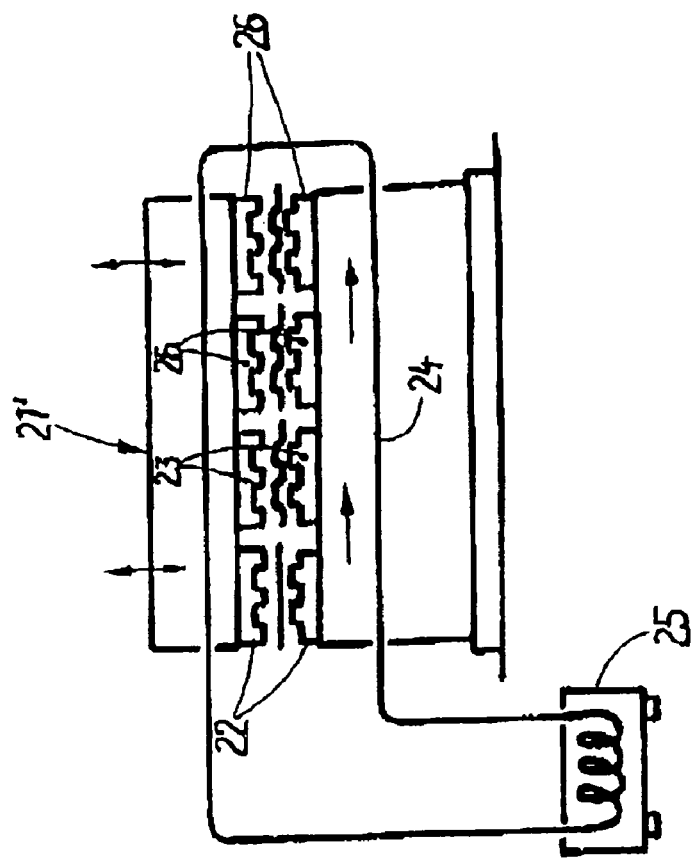
FIG. 4 shows a further method diagram, illustrated only partially, for the hot forming of the basic sheet and reinforcing sheet, in which, after the common hot forming, these are cooled in steps in a sequence of positively cooled fixing tools, in accordance with preferred embodiments of the present invention.
Figure 4:
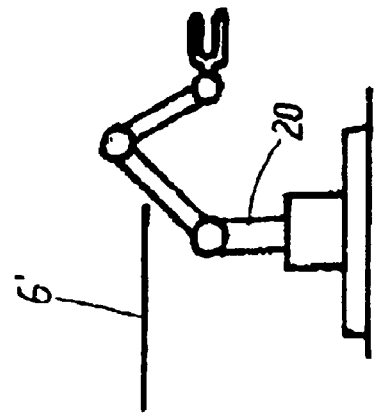
Figure 4:
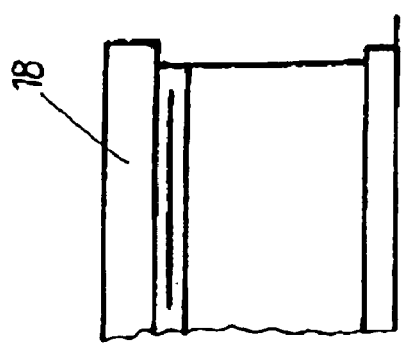

In connection with FIGS. 4 and 5, then, the four-stage method variant for the production of a hot-formed locally reinforced structural part may be dealt with. The method diagram, a detail of which is illustrated in FIG. 4, corresponds largely to the illustration according to FIG. 1*b*, so that as far as possible reference may be made to the statements in connection with the method outlined further above. Only the forming press 21' differs in the number of stages, to be precise four, from the forming press 21 according to FIG. 1*b* with only two stages. The first two stages of the forming press 21' are also largely identical to the two single stages of the forming press 21, that is to say, in the forming press 21', a positively cooled forming tool 22 is likewise first provided, this being followed by a likewise cooled fixing and trimming tool 23. The particular feature of the forming press 21', as compared with that according to FIG. 1*b*, is that, within the longer forming press 21', two further likewise cooled fixing tools 26, one following the other equidistantly, are arranged. They differ from the fixing and trimming tool 23 merely in that they do not contain a trimming device.

By means of the four tools 22, 23, 26 and 26 integrated in the forming press 21', the hot-formed composite sheet structures can be cooled in four successive stages, thus shortening the cycle time to half the time, as compared with the two-stage cooling according to the method diagram shown in FIG. 1*b*. The impressions of the four tools are in contact with the workpieces on both sides virtually over the entire surface and in each case fix them reliably in their desired shape. By indirect or direct positive cooling of the workpieces, heat can be extracted from them very quickly. As indicated in FIG. 2, the impression of the forming tool 22 is positively cooled by means of integrated cooling ducts, whereas the fixing tools 23 and 26 carry a grid of cooling ducts, these being open towards the shape-defining surface of the impression, so that the cooling medium—air, air/water-mist mixture, air/liquid-air mixture—can act directly upon the workpieces. Moreover, the tools are all connected to one another by means of a transfer device, so that the workpieces can be passed on from tool to tool intermittently.

The procedure in the method with four-phase cooling will be explained below in connection with FIG. 5 which illustrates an unquantified temperature/time graph in respect of the average workpiece temperature, that is to say the temperature profile in time during forming and subsequent multi-stage cooling.

The time point zero constitutes the moment at which the patched composite sheet structure is extracted from the furnace 18 at about 930° C. During the short extraction phase E, the sheet is already cooled somewhat and passes, at at least 850° C., into the open forming tool 22.

When the introduction operation E has elapsed, the work cycle of the press commences, of which FIG. 5 illustrates four successive cycles Z and the associated temperature profile of a workpiece led intermittently through the forming press 21'. Each cycle is composed of a closing phase S, of a fixing phase F and of an opening phase O. In the closing phase S, the workpiece is not yet in contact with the cooled impression over the entire area, at least in the forming tool 22, so that the cooling action of the impression does not yet fully come to bear during the closing and forming phase. Even during the later cycles Z, during which the workpiece is located in the fixing tools 23 and 26, the full cooling action commences only after the conclusion of the closing operation S.

As soon as the operation of closing the tools has ended—in the case of the forming tool the hot forming of the patched composite sheet structure is also ended at this moment—, the fixing phase F commences, during which, by virtue of the intimate contact of the tool impression with the workpiece, the actual cooling of the latter takes place within the respective cycle. In the first fixing and cooling phase following the hot forming, the workpiece has to be cooled to well below the solidification temperature $E_L$ of the hard solder, so that the hard soldering holds reliably after the opening of the tool and does not, for example, partially spring open. Moreover, towards the end of the first fixing and cooling phase, the workpiece must be cooled to about 500° C., at the same time maintaining a specific temperature gradient in time, so that the desired material strength is obtained in the workpiece. The fixing and cooling phase F is critical for the cycle time Z because it takes up the largest portion of this.

As soon as the fixing and cooling phase of a cycle is concluded, the forming press and, with it, the tools can be opened—opening phase O. Even with the tools partially open, the transfer device grips the workpieces exposed in the tools, lifts them out of the female dies, transfers them into the female die of the next following tool and deposits them there in an ordered manner, the next closing operation already commencing. During the opening phase O, the workpiece rests only loosely in the impression of the respectively lower tool part and is not in contact with the respective impression either on the topside or from below over the entire area and intimately, so that, even during the opening phases, the cooling action of the impression takes effect only moderately.

With a view to reducing the temperature gradient between the workpiece and the cooling medium, the cooling rates in the cycles further back are lower than in the cooling operations further forward which take place under a greater temperature difference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method for the production of a three-dimensionally shaped structural part having a basic metal sheet and at least one smaller locally arranged reinforcing metal sheet, comprising connecting the basic metal sheet, in a flat state or in an incompletely formed preforming state, to the reinforcing metal sheet at a point predetermined for a subsequent reinforcing point, and subsequently joint forming the parts of a resulting patched composite metal sheet structure by an openable and closeable forming tool in a forming press, wherein heating of the patched composite metal sheet structure before the joint forming to a temperature which is above a forming temperature of the material, then forming the patched composite metal sheet structure in a hot state into a desired shape with subsequently cooling thereof in the forming tool in a closed state, or in a following fixing tool, with a desired forming state being fixed mechanically, and parts of the patched composite sheet metal structure are heated to above a structural transformation temperature of the material above which the material structure is in an austenitic state.

2. Method according to claim 1, wherein the patched composite sheet structure is heated before joint forming to a specific temperature within a temperature range between 850° C. and 930° C.

3. Method according to claim 1, wherein the at least one reinforcing sheet or at least one of the reinforcing sheets is itself preformed, before being combined with the basic sheet, by affixation of reinforcing beads, in such a way that said reinforcing sheet nevertheless can come to bear in a dimensionally accurate manner at the predetermined point on the basic sheet and can be fixed to the latter.

4. Method according to claim 1, wherein extraction of the heated composite sheet structure from a heating furnace, and introduction of the composite sheet structure in a defined position into the open forming tool up to the commencement of closing of the forming tool take place in a timespan of less than three seconds.

5. Method according to claim 4, wherein the timespan is less than two seconds.

6. Method according to claim 1, wherein counting from commencement of the closing of the forming tool to complete forming, the joint forming of the heated composite sheet structure introduced in a defined position into the open forming tool takes place in 3 to 5 seconds.

7. Method according to claim 1, wherein cooling of the jointly formed composite sheet structure takes place, at least in a first cooling phase on the forming tool, by contacting with the forming tool positively cooled from inside.

8. Method according to claim 7, wherein the patched composite sheet structure remains in the forming tool which is kept closed after the joint forming and is cooled down to at least to about 500° C.

9. Method according to claim 1, wherein the patched composite sheet structure remains in the forming tool which is kept closed after the joint forming and is first cooled to about 500° C. and is subsequently transferred into an adjacent openable and closeable fixing tool which, in the closed state, comes into contact with the formed composite sheet structure received therein on both sides over the surface by a dimensionally accurate impression and continues to fix the desired forming state of the composite sheet structure mechanically, and wherein, in the hot state which then prevails the formed composite sheet structure is trimmed by a trimming tool integrated in the fixing tool and continues to be cooled by the positively cooled impression of the fixing tool.

10. Method according to claim 1, wherein after the joint forming, the positive cooling of the patched composite sheet structure is carried out first in the forming tool and subsequently, with the desired forming state of the composite sheet structure constantly being fixed mechanically, by a sequence of adjacent openable and closeable fixing tools which, in a closed state, come into contact on both sides over the surface, with the composite sheet structure received in each case therein by a dimensionally accurate impression, the composite sheet structure being passed on from fixing tool to fixing tool and being cooled to at least 150° C. in a plurality of successive stages by impressions of the fixing tools, said impressions being positively cooled from inside.

11. Method according to claim 10, wherein the patched composite sheet structure is cooled after the joint forming either by the forming tool alone or jointly with a subsequent sequence of fixing tools for 20–40 seconds, preferably about 25–30 seconds.

12. Method according to claim 1, wherein the patched composite sheet structure is cooled after the joint forming either by the forming tool alone or jointly with a subsequent sequence of fixing tools for 20–40 seconds.

13. Method according to claim 1, wherein to achieve a martensitic material structure in the formed composite sheet structure, the latter is cooled at least in the temperature range between 800° C. and 500° C., rapidly, that is to say from 800° C. to 500° C. in less than four seconds.

14. Method according to claim 1, wherein the formed composite sheet structure is cooled to achieve a bainitic material structure, at least in the temperature range between 800° C. and 500° C., comparatively slowly from 800° C. to 500° C. in a timespan lasting longer than four seconds.

15. Method according to claim 1, wherein the heating of the patched composite sheet structure takes place in a furnace in a protective-gas atmosphere.

16. Method according to claim 1, wherein the basic sheet and/or the reinforcing sheet consists of a water-hardening heat-treatable steel having the alloying composition listed below, where the contents are to be understood in % by weight and are to be added in addition to iron as the basic metal:

| | |
|---|---|
| Carbon: | 0.23–0.27%, |
| Silicon: | 0.15–0.50%, |
| Manganese: | 1.10–1.40%, |
| Chromium: | 0.10–0.35%, |
| Molybdenum: | 0–0.35%, |
| Titanium: | 0.03–0.05%, |
| Aluminum: | 0.02–0.06%. |
| Phosphorus: | max. 0.025%, |
| Sulphur: | max. 0.01%, and |
| Others in total: | 0.0020–0.0035%. |

17. Method according to claim 1, wherein at least one of the basic sheet and the reinforcing sheet is precoated inorganically against corrosion and consists of a steel having the alloying composition listed below, where the contents are to be understood in % by weight and are to be added in addition to iron as the basic metal:

| | |
|---|---|
| Carbon: | 0.20–0.25%, |
| Silicon: | 0.15–0.35%, |
| Manganese: | 1.10–1.35%, |
| Chromium: | 0.10–0.35%, |
| Titanium: | 0.02–0.05%, |
| Sulphur: | max. 0.008%, and |
| Others in total: | 0.002–0.004%. |

18. Method according to claim 1, wherein the material strength of the composite sheet structure is increased to about 1300–1600 MPa by the heat treatment integrated into the process of joint hot forming.

19. Method according to claim 1, wherein locally reinforced shell parts for hollow members integrated into the passenger cell of a vehicle body are produced by means of this method.

20. Method according to claim 1, wherein locally reinforced shell parts for hollow members integrated into the chassis of a vehicle are produced by means of this method.

21. Method according to claim 1, wherein the patched composite sheet structure is cooled after the joint forming either by the forming tool alone or jointly with a subsequent sequence of fixing tools for about 25–30 seconds.

22. Method for the production of a three-dimensionally shaped structural part having a basic sheet and at least one smaller locally arranged reinforcing sheet, comprising connecting the basic sheet, in a flat state or in an incompletely formed preforming state, to the reinforcing sheet at a point predetermined for a subsequent reinforcing point, and subsequently joint forming the parts of a resulting patched composite sheet structure by an openable and closeable forming tool in a forming press, wherein heating of the patched composite sheet structure before the joint forming to a temperature which is above a forming temperature of the material, then forming the patched composite sheet structure in a hot state into a desired shape with subsequently cooling thereof in the forming tool in a closed state, or in a following fixing tool, with a desired forming state being fixed mechanically, wherein, the reinforcing sheet is affixed to the basic sheet, at least one of the sheets is provided on its contact surface with a hard solder in a surface-covering manner, the latter being melted during heating to forming temperature and the jointly formed composite sheet structure being cooled at least up to the complete solidification of the hard solder, with the forming state being fixed mechanically in the forming tool which is kept closed.

23. Method according to claim 22, wherein the contact surface of the at least one sheet provided with hard solder is provided with an excess of hard solder and this excess is expressed at an edge of the reinforcing sheet during the joint forming.

24. Method according to claim 22, wherein the contact surfaces both of the basic sheet and of the reinforcing sheet are cleaned and/or activated for hard soldering before the application of hard solder.

25. Method according to claim 22, wherein the hard solder is applied in paste form.

26. Method according to claim 22, wherein the hard solder is applied in the form of chips.

27. Method according to claim 22, wherein the hard solder is applied in the form of a soldering foil blank punched out according to shape.

28. Method according to claim 22, wherein a hard solder, the solidification temperature of which is at least 500° C., preferably at least 550° C., is used.

29. Method according to claim 22, wherein, after the application of the hard solder and after the reinforcing sheet has been laid in a defined position onto the basic sheet, the two are provisionally fixed to one another by a single tacking point.

30. Method according to claim 22, wherein the heating of the patched composite sheet structure takes place in a furnace in a protective-gas atmosphere.

31. Method according to claim 22, wherein the basic sheet and/or the reinforcing sheet consists of a water-hardening heat-treatable steel having the alloying composition listed below, where the contents are to be understood in % by weight and are to be added in addition to iron as the basic metal:

| | |
|---|---|
| Carbon: | 0.23–0.27%, |
| Silicon: | 0.15–0.50%, |
| Manganese: | 1.10–1.40%, |
| Chromium: | 0.10–0.35%, |
| Molybdenum: | 0–0.35%, |
| Titanium: | 0.03–0.05%, |
| Aluminum: | 0.02–0.06%, |
| Phosphorus: | max. 0.025%, |
| Sulphur: | max. 0.01%, and |
| Others in total: | 0.0020–0.0035%. |

32. Method according to claim 22, wherein the material strength of the composite sheet structure is increased to about 1300–1600 MPa by the heat treatment integrated into the process of joint hot forming.

33. Method according to claim 22, wherein locally reinforced shell parts for hollow members integrated into the passenger cell of a vehicle body are produced by means of this method.

34. Method according to claim 22, wherein locally reinforced shell parts for hollow members integrated into the chassis of a vehicle are produced by means of this method.

* * * * *